April 24, 1945. H. J. DE N. McCOLLUM 2,374,607
MEANS FOR DRIVING SUPERCHARGERS FOR AIRPLANE CABINS
Filed May 21, 1942
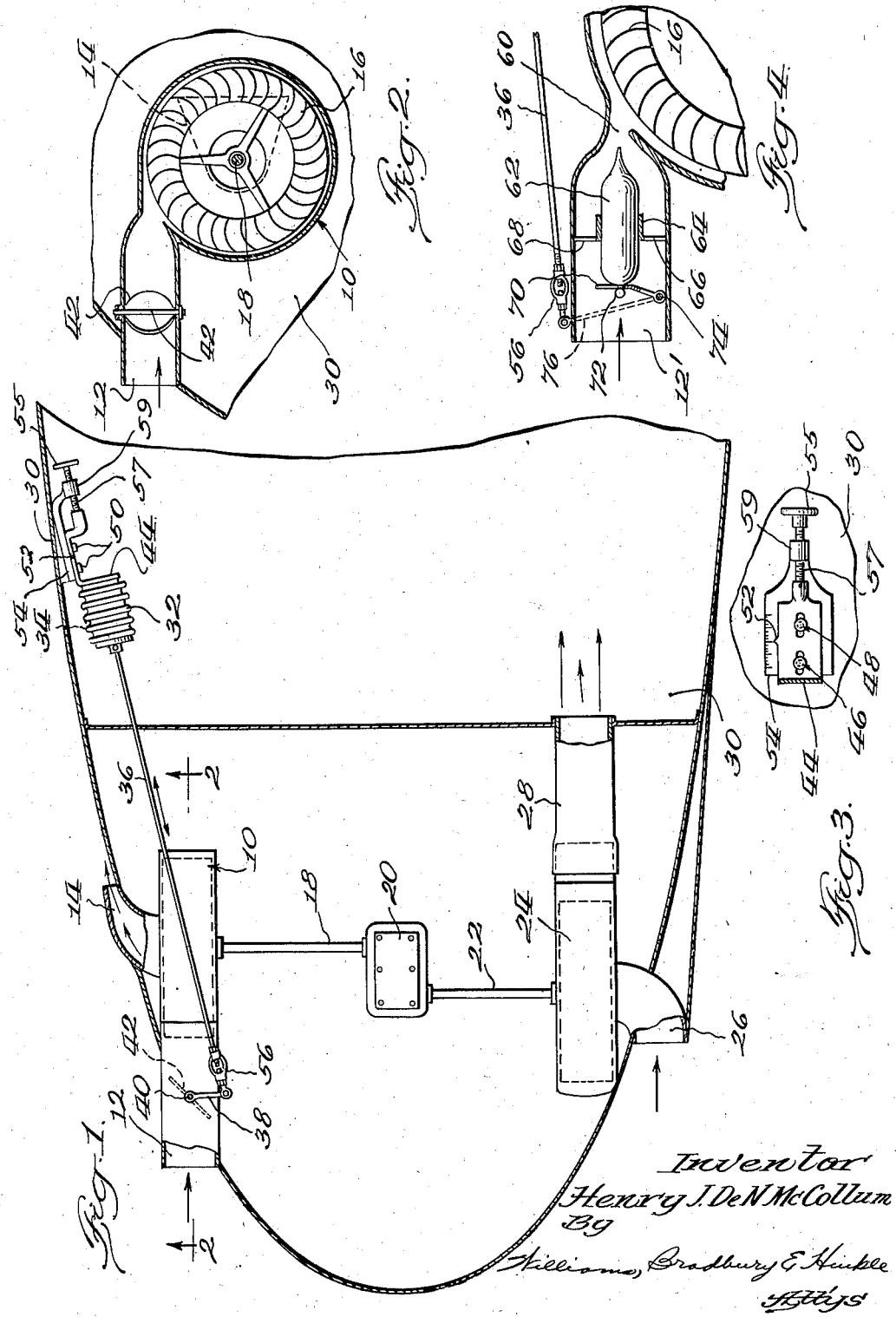
Inventor
Henry J. DeN McCollum
By
Williams, Bradbury & Hinkle
Attys Patented Apr. 24, 1945

2,374,607

UNITED STATES PATENT OFFICE 2,374,607

MEANS FOR DRIVING A SUPERCHARGER FOR AIRPLANE CABINS

Henry J. De N. McCollum, Chicago, Ill.; Thelma McCollum executrix of said Henry J. De N. McCollum, deceased Application May 21, 1942, Serial No. 443,916

1 Claim. (Cl. 244—59)

My invention relates to method and means of driving a supercharger for airplane cabins.

In passenger airplanes which are intended to operate at high altitudes, it is desirable to supercharge the interior of the passenger compartment or cabin in order to protect the passengers against the uncomfortable and deleterious effects of reduced atmospheric pressure at high altitudes. The methods and means heretofore used to accomplish such supercharging of airplane cabins have been expensive, complicated and heavy, as well as objectionable from a service standpoint.

An object of my invention is to overcome these disadvantages of the prior art methods and means for supercharging airplane cabins.

Another object of my invention is to provide a simple, inexpensive, light weight means for supercharging an airplane cabin.

Another object of my invention is to provide a method and means for supercharging an airplane cabin which will automatically maintain the cabin at any predetermined pressure.

Another object of my invention is to provide a method and means for supercharging an airplane cabin which functions incidental to the operation of the plane and requires no separate source of energy.

Another object of my invention is to provide a method and means for supercharging an airplane cabin which will not increase the fire hazard.

Other objects and advantages will become apparent as the description proceeds.

In the drawing:

Fig. 1 is a horizontal section through the nose of an airplane, illustrating one form of my invention applied thereto;

Fig. 2 is a partial vertical section taken on the line 2—2 of Fig. 1;

Fig. 3 is a detailed view of the means for adjusting the pressure in the cabin; and Fig. 4 is a view similar to Fig. 1, but showing a modified form of my invention.

Referring to Figs. 1 and 2, it will be seen that I have illustrated a form of my invention wherein an air-driven turbine 10 is supplied with air through an inlet or ram 12, so positioned that air is forced thereinto by movement of the plane itself, although this inlet may be placed to receive the blast from one of the propellers which drives the plane. The air-driven turbine 10 discharges through an outlet 14 so designed that the movement of the plane tends to create a suction at the outlet whereby the maximum pressure differential is obtained between the inlet and outlet for the turbine.

Air forced into the inlet 12 impinges upon the blades of the turbine wheel 16, causing this wheel to rotate and drive a shaft 18 leading to a gear box 20. A second shaft 22 connects the gear box with a rotary fan or blower 24 which receives air through an inlet 26, likewise directed so that either the movement of the plane or the operation of one of its propellers forces air into this inlet. The air admitted through inlet 26 is forced by blower 24 through a discharge pipe 28, leading to the cabin 30 and raises the pressure of the air therein.

A pressure responsive device 32 is located at any convenient position in the cabin 30 and is exposed to the pressure existing therein. This pressure responsive device is illustrated as comprising a Sylphon or bellows 34 which is sealed and filled with gas under pressure so that the bellows tends to lengthen as the pressure in the cabin decreases and tends to shorten as the pressure in the cabin increases. It will be understood, however, that my invention is not limited to any particular form of pressure responsive device and that any other suitable pressure responsive device may be utilized in lieu of that shown.

Operating rod 36 connects the pressure responsive device 34 with arm 38 attached to a shaft 40 carrying a butterfly valve 42 controlling the admission of air through the inlet or ram 12.

The operating rod 36 is preferably made in two parts and is connected by a turnbuckle 56 forming a ready means for adjusting the mechanical linkage to compensate for initial variations in sizes of the parts and for wear resulting from operation.

The pressure responsive device 34 is illustrated as being supported on a bracket 44 attached to a wall of the cabin 30. Under some circumstances it may be desirable to provide for varying the pressure to be maintained in the cabin 30 and in Fig. 3 I have shown this bracket as being mounted to the cabin wall by means of bolts 46 and 48 passing through suitable slots in the bracket and having bracket retaining heads 50. The bracket may be provided with a pointer 52 which cooperates with a scale on a plate 54 rigidly attached to the cabin wall to indicate the setting of the pressure responsive device. Bracket 44 may be shifted lengthwise of plate 54 by rotation of hand wheel 55 on shaft 57 swivelly connected to bracket 44 and having threaded engagement with extension 59 of plate 54.

In the operation of my invention, air is forced into the inlet or ram 12 by the forward movement of the airplane. When the plane is at sea level the pressure in the cabin will be normal atmospheric pressure and no supercharging of the cabin is required. The pressure responsive device 34 will, therefore, be contracted and will hold butterfly valve 42 in closed position. This cuts off the air supply for the turbine 10 and this turbine and the blower 24 driven thereby are thus inoperative.

When the plane rises to an altitude materially above sea level, the pressure in the cabin decreases, thereby permitting the bellows 34 to expand and open the valve 42. This admits air to turbine 10, which rotates and drives blower 24 at a speed materially greater than that of the turbine 10. Blower 24 then forces air into cabin 30 and raises the pressure in the cabin 30 to sea level atmospheric pressure, if that is the pressure for which the device 32 is set. As soon as this occurs, bellows 34 contracts and closes valve 42, thereby stopping the operation of the turbine 10 and blower 24.

It will be understood by those skilled in the art that the cabin 30 is of the sealed type and is capable of holding an inside pressure greater than that of the atmosphere through which the plane is traveling. In most instances it will not be necessary to maintain the pressure in the cabin as great as atmospheric pressure at sea level, as a somewhat lower pressure is not objectionable. By rotating hand wheel 55, bracket 44 may be shifted to adjust the pressure responsive device for any desired cabin pressure.

In Figs. 1 and 2 I have illustrated a simple air-driven turbine as being controlled by a butterfly valve. While this construction will operate satisfactorily, it is not as efficient as the modification shown in Fig. 4 wherein the air admitted through the ram 12' flows through nozzles 60 arranged side by side and converting the single air stream into a plurality of laterally disposed jets which impinge upon the blades of the turbine wheel 16. Each nozzle 60 is provided with a needle valve 62 for regulating the flow of air through its associated nozzle.

The needle valves 62 are slidably mounted in a guide 64, having openings 66 and 68 for the passage of the air and the longitudinal movements of the needle valve 62 are controlled by slotted arms 70 engaging the neck-like portions of knobs 72 attached to or integral with the valves 62. Slotted arms 70 are attached to a transverse shaft 74 having an arm 76 connected to the operating rod 36 leading to the pressure responsive device 32 located in the cabin 30.

In the embodiment of Fig. 4 the pressure responsive device 32 controls the longitudinal movement of the valves 62 and causes these valves to stop the flow of air through their associated nozzles 60 when the pressure in the cabin is as high as the predetermined pressure for which the pressure responsive device is set. When the pressure in the cabin drops below the predetermined value, the pressure responsive device moves the valves 62 to the left, as viewed in Fig. 4, to admit air through nozzle 60, thereby rotating turbine wheel 16 and driving bellows 34 to supercharge the cabin to the desired degree. As soon as the pressure in the cabin reaches the predetermined value, pressure responsive device 32 again shifts valve 62 to close nozzle 60.

The inlet or ram 12' of the modification shown in Fig. 4 may be located like the inlets 12 and 26 so that air is forced thereinto by the forward movement of the plane or may be located behind a propeller for driving the plane so that the inlet 12' receives the blast from the propeller whenever this propeller is operating. My invention is not limited to the use of any particular type of air-driven turbine or to any particular valve arrangement therefor and air motors and control means other than those shown in the drawing may be used in lieu of the forms illustrated in the drawing.

While I have described my invention as operating intermittently, it is not limited to such intermittent operation, but may operate continuously where the leakage of air from the cabin is sufficiently great to call for such continuous operation. Where my invention operates continuously, the valve mechanism for controlling admission of air to the turbine 10 will be regulated by the pressure responsive device 32 so that the desired pressure is maintained in the cabin 30.

It is to be understood that my invention is not limited to the details shown and described, but may assume numerous other forms and that the scope of my invention is described by the following claim.

I claim:

Apparatus for supercharging a cabin of an airplane comprising an air-driven turbine, an inlet for said turbine so positioned that air is forced into said inlet by movement of the airplane, an outlet for said turbine so positioned that movement of the airplane tends to create a suction at said outlet, a blower driven by said turbine, gearing connecting said turbine and blower whereby the latter is driven at a greater speed than said turbine, an inlet for said blower so positioned that movement of the airplane tends to force air into said inlet, an outlet for said blower communicating with said cabin, valve means for controlling the admission of air through said turbine inlet, pressure responsive means in said cabin for controlling said valve means, and means for varying the setting of said pressure responsive means to maintain any desired pressure in said cabin.

HENRY J. DE N. McCOLLUM.